United States Patent [19]

Bredeweg

[11] 4,239,863
[45] Dec. 16, 1980

[54] PROCESS FOR THE POLYMERIZATION OF ACRYLONITRILE-BUTADIENE-STYRENE RESINS

[75] Inventor: Corwin J. Bredeweg, Midland, Mich.

[73] Assignee: The Dow Chemical Company, Midland, Mich.

[21] Appl. No.: 52,706

[22] Filed: Jun. 28, 1979

[51] Int. Cl.³ ............................................ C08F 291/02
[52] U.S. Cl. ..................................... 525/263; 525/264
[58] Field of Search ................................. 525/263, 264

[56] References Cited

U.S. PATENT DOCUMENTS

| | | | |
|---|---|---|---|
| 2,694,692 | 11/1954 | Amos et al. ........................... 260/45.5 |
| 3,243,481 | 3/1966 | Ruffing et al. ......................... 260/880 |
| 3,515,692 | 6/1970 | Carrock et al. ....................... 525/263 |
| 3,728,417 | 4/1973 | Knoack .................................. 525/263 |
| 3,903,199 | 9/1975 | Dalton ............................. 260/876 R |
| 3,903,200 | 9/1975 | Cincera et al. .................... 260/876 R |
| 3,996,311 | 12/1976 | Westphal ............................. 525/263 |
| 4,046,839 | 9/1977 | Papetti ................................. 525/263 |
| 4,064,116 | 12/1977 | Papetti ................................. 525/263 |
| 4,098,847 | 7/1978 | Stevenson et al. ................... 525/263 |

Primary Examiner—William F. Hamrock
Attorney, Agent, or Firm—R. B. Ingraham

[57] ABSTRACT

Acrylonitrile-butadiene-styrene (ABS) resins are prepared by the mass or mass-suspension process employing a tertiary-butyl peroxy initiator having a 10-hour half-life between about 50° and 95° C. wherein initial polymerization of up to about 10 weight percent solids is conducted under plug flow conditions. From about 5 to 10 percent conversion to about 40 percent conversion is polymerized with agitation. The remaining polymerization is done with or without agitation. Improved impact resistance is obtained.

6 Claims, 3 Drawing Figures

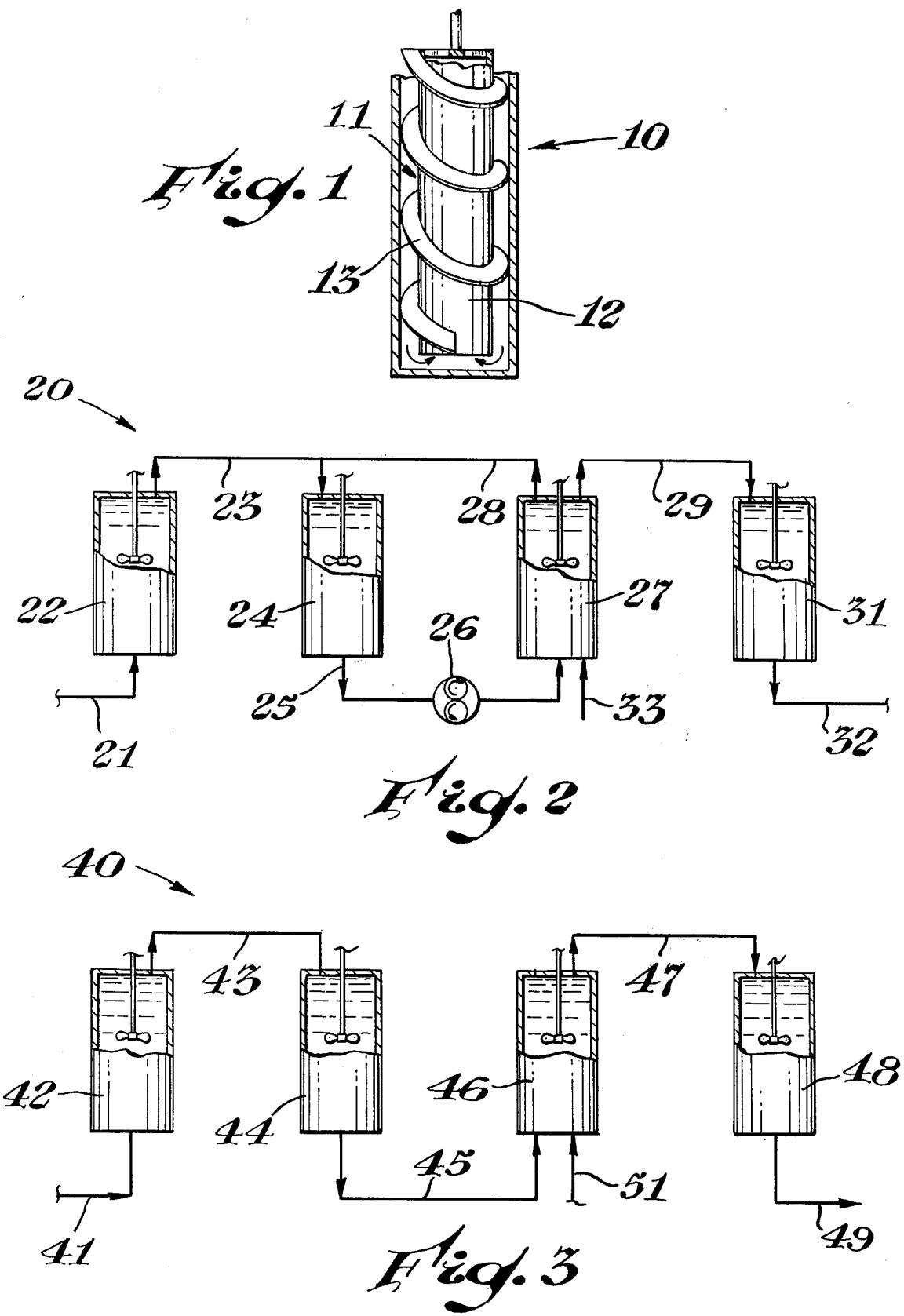

PROCESS FOR THE POLYMERIZATION OF ACRYLONITRILE-BUTADIENE-STYRENE RESINS

Acrylonitrile-butadiene-styrene (ABS) resins are prepared in a variety of manners. One such technique is to mechanically melt blend rubber with a styrene-acrylonitrile resin. Another procedure involves the polymerization of styrene and acrylonitrile in the presence of a preformed rubber latex. Another procedure involves the blending of the hereinbefore derived ABS resins with a latex derived rubber. Other ABS resins are prepared by the mass or mass-suspension technique wherein a reinforcing rubber is dissolved in a mixture of styrene and acrylonitrile, the styrene and acrylonitrile polymerized with agitation until at least the rubber has separated as a plurality of particles, the particles having occluded therein styrene-acrylonitrile copolymer. On completion of the polymerization to the desired degree of conversion, solvent if any and unreacted monomers are removed to provide a polymer which comprises a styrene-acrylonitrile polymer matrix having dispersed therethrough a plurality of particles of rubber, the particles having occluded therein styrene-acrylonitrile polymer. Generally such particles have average diameters in the range of from about 0.2 to about 5 microns. A mass or bulk polymerization technique is particularly desirable in that it requires minimal equipment and minimal handling of the materials. Generally in the preparation of rubber reinforced thermoplastic resins such as ABS resins, it is desirable to obtain the maximum degree of reinforcing for rubber employed. The rubber in general is the most costly component and it is desired that the maximum impact resistance or toughness be obtained per unit weight of rubber employed in the composition.

It would be desirable if there were an improved process for the preparation of ABS resins.

It would be desirable if there were available an improved process for the preparation of ABS resins which employed a rubber component more efficiently.

It would be desirable if there were available an improved rubber efficient ABS process employing a free radical initiator.

These benefits and other advantages in accordance with the present invention are achieved in a process for the preparation of acrylonitrile-butadiene-styrene resins wherein styrene and acrylonitrile are copolymerized in the presence of a soluble butadiene reinforcing rubber the butadiene rubber being dissolved in a mixture of acrylonitrile and styrene, initiating polymerization of the styrene and acrylonitrile thereby causing the rubber under the influence of agitation to separate in the form of a plurality of particles having average diameters of about 0.2 to about 5 microns, continuing polymerization of the styrene and acrylonitrile until from about 50 to about 90 weight percent of the styrene and acrylonitrile have copolymerized, removing at least a majority of nonvolatile material therefrom and recovering an ABS polymer, the improvement which comprises incorporating within the ABS solution prior to polymerization a free radical polymerization initiating material which is a tertiary butyl peroxy ester having a 10-hour half-life of between about 50° and 95° C. or mixtures thereof.

The tertiary-butylperoxy esters useful in the practice of the present invention are those tertiary-butylperoxy esters which have a 10-hour half-life of between 50° and 95° C. Such tertiary-butylperoxy esters include:

| Catalyst | 10-Hour Half-life, °C. |
| --- | --- |
| t-Butylperoxy pivalate | 55 |
| 1,1,3,3-Tetramethylbutylperoxy-2-ethylhexanoate | 60 |
| 2,5-Dimethyl-2,5-bis(2-ethyl-hexanoylperoxy)hexane | 67 |
| t-Butylperoctoate | 73 |
| t-Butylperoxyisobutyrate | 79 |
| t-Butylperoxymaleic acid | 87 |

Styrene and acrylonitrile of commercial purity are suitable for the practice of the present invention.

Suitable rubbers for the practice of the present invention are diene rubbers or mixtures of diene rubbers; i.e., any rubbery polymer (a polymer having a glass temperature not higher than 0° C., and preferably not higher than −20° C., as determined by ASTM Test D -746-52T) of one or more conjugated 1,3 dienes; e.g., butadiene, isoprene, piperylene, chloroprene, etc. Such rubbers include homopolymers, interpolymers and block copolymers of conjugated 1,3 dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc; and α-alkylstyrene, such as α-methylstyrene, α-ethylstyrene, α-methyl-p-methylstyrene, etc,; vinyl naphthalene, etc.); ar-halo monovinylidene aromatic hydrocarbons (e.g., the o-, m- and p-chlorostyrenes, 2,4-di-bromostyrene, 2-methyl-4-chlorostyrene, etc.); acrylonitrile; methacrylonitrile; vinyl pyridines; and the like.

A preferred group of rubbers are those consisting essentially of 60 to 100 percent by weight of butadiene and/or isoprene and up to 40 percent by weight of a monomer selected from the group consisting of alkenyl aromatic hydrocarbons (e.g., styrene) and unsaturated nitriles (e.g., acrylonitrile), or mixtures thereof. Particularly advantageous substrates are butadiene homopolymer or an interpolymer or A-B block copolymers of from 70 to 95 percent by weight butadiene and from 5 to 30 percent by weight styrene.

The rubbers or rubbery reinforcing agents employed in the present invention must also meet the following requirements: an inherent viscosity from about 0.9 to 2.5 and preferably 0.9 to 1.7 grams per deciliter (as determined at 25° C. employing 0.3 grams of rubber per deciliter of toluene). Advantageously, the amount of such rubbery reinforcing agent can be from 5 to 35 weight percent of the final product, and beneficially from 10 to 25 percent, and most advantageously from 15 to 25 percent. If desired, a molecular weight regulator or chain transfer agent may be added to the polymerizing material in relatively small amounts, such as from about 0.001 to 1 percent by weight of the polymerizable monomers. Such chain transfer agents can conveniently be organic thiols such as butyl mercaptans, normal or tertiary dodecyl mercaptans, lauryl mercaptan, stearyl mercaptan, benzyl mercaptan, cyclohexylmercaptan; dithiols such as 1,6-hexanedithiol; halogenated hydrocarbons such as carbon tetrachloride, carbon tetrabromide, bromotrichloromethane and the like.

In the preparation of ABS resins in accordance with the present invention, it is desirable that the initial polymerization, that is conversion of monomer to polymer from about 3 to 10 weight percent occur without backmixing in the event that a continuous process is employed. ABS resins in accordance with the present invention may readily be prepared employing a batch polymerization, continuous polymerization, mass or bulk polymerization, or mass suspension polymerization. As the polymerization progresses and increasing amounts of styrene-acrylonitrile polymer are formed, the rubber separates as a distinct phase which essentially is a solution of the rubber in monomer. Under the influence of shearing agitation the rubber becomes a dispersed phase and separates as particles having diameters ranging from about 0.2 to about 5 microns. The rubber particles, however, contain a substantial portion of styrene and acrylonitrile monomer which on further polymerization results in rubber particles containing occulsions of styrene-acrylonitrile polymer dispersed within a rigid phase of styrene-acrylonitrile polymer. As the polymerization progresses, the reaction mixture becomes increasingly viscous. If the bulk suspension process is employed after phase inversion, that is the separation of the rubber, the reaction mixture may be dispersed as a plurality of droplets in water and the polymerization continued. If polymerization is in the bulk or mass mode, the viscosity of the reaction mixture increases as monomer is converted to polymer, and generally it is desirable to discontinue polymerization at conversions from about 60 to 90 percent of the monomer to polymer and remove the residual volatile materials from the polymer. Generally this is accomplished by heating the reaction mixture to a temperature of 200° to 240° C. under subatmospheric pressure, for example from a pressure of 0.1 to about 100 millimeters of mercury. Oftentimes it is desirable to maintain a reduced viscosity in the polymerizing mixture. This is readily accomplished by employing a solvent. Usually such solvents are employed in proportions of from about 5 to 25 weight percent of the combined weight of the monomers and rubbers. Suitable solvents are volatilie aromatic compounds, such as benzene, toluene, xylene, ethylbenzene and the like, as well as cycloaliphatic compounds such as cyclohexane, methyl-cyclohexane and the like.

Polymerization in accordance with the present invention is generally accomplished between temperatures of from about 60° C. to 180° C. and advantageously employs a progressive temperature program wherein polymerization is initiated at a lower temperature and completed at a higher temperature. The particular temperatures employed are dependent in general upon the properties that are desired in the ABS resin and are well recognized by those skilled in the art. Various additives such as stabilizers, antioxidants, chain transfer agents, solvents and the like may be employed in the acrylonitrile-styrene-rubber solution.

The present invention is exemplified but not limited by the following examples wherein the drawing depicts the reactor configuration used therein.

FIG. 1 schematically depicts a reactor employing a hollow auger.

FIGS. 2 and 3 schematically depict variations of a continuous polymerization system.

In FIG. 1 there is schematically depicted a polymerization vessel 10 having disposed therein an auger 11. The auger 11 is a generally hollow cylindrical body 12 having a helically disposed external flight 13. The diameter of the auger 11 approximates the internal diameter of the vessel 10. When a viscous liquid is disposed in the vessel 10 and the auger 11 rotated, the flight 13, in the event of clockwise rotation, forces the liquid to the bottom of the vessel which then flows upward through the hollow body 12 to provide a desirable mixing and permit maintenance of the viscous liquid at a generally uniform temperature.

The apparatus of FIG. 2 is generally designated by the reference numeral 20 and comprises a first major feed line 21 which discharges into a first agitated polymerization vessel 22. The vessel 22 in turn discharges to line 23 which is connected to a second agitated polymerization vessel 24. The vessel 24 discharges through line 25 having therein a pump 26 which is adapted to feed material from the line 25 into a third agitated polymerization vessel 27. The vessel 27 has a first discharge 28 which discharges into line 23 and a second discharge 29 which provides feed to a fourth agitated polymerization vessel 31. Material from the fourth vessel 31 is discharged through line 32. Thus the apparatus depicted in FIG. 2 provides a first generally polymerizing vessel 22, a recirculating agitated polymerization zone comprising vessels 24 and 27 and lines 25 and 28. Polymerization vessel 31 provides an agitated polymerization or finishing zone. A second feed line 33 is connected to vessel 27 generally adjacent to line 25.

In FIG. 3 there is schematically depicted an apparatus generally designated by the reference numeral 40 having a first feed line 41 and a first agitated polymerization vessel 42. The vessel 42 discharges through line 43 to a first agitated polymerization vessel 44. The vessel 44 discharges through line 45 to a second agitated polymerization vessel 46 which in turn discharges through line 47 to an agitated polymerization vessel 48 which discharges through line 49. A second feed line 51 enters the second agitated vessel 46 adjacent the line 45.

EXAMPLE 1

A plurality of polymerizations were conducted employing an apparatus generally as depicted in FIG. 2 wherein the pump equivalent to pump 26 forwarded material at a rate about twice the rate at which material was fed into feed line 21. The following feed composition was employed:

54.4 parts by weight of styrene
20.1 parts by weight acrylonitrile
14.5 parts by weight ethylbenzene as solvent
1.0 part by weight mineral oil
10.0 parts by weight of polybutadiene rubber commercially available under the trade designation of Solprene 308

The foregoing mixture will be hereinafter referred to as solution A.

Three separate polymerizations were continued wherein a peroxy catalyst or polymerization initiator was added to solution A at various levels as indicated in the following table wherein ppm is an abbreviation for parts per million by weight based on the combined weights of styrene, acrylonitrile rubber and solvent. Ty is tensile strength in pounds per square inch; yield elong is elongation; MFR is melt flow rate in grams per 10 minutes in accordance with Condition I ASTM D 1238-62T.

Solution A was mixed with lauroyl peroxide and pumped to vessel 22 at a rate of 535 grams per hour. When the t-butylperoxy pivalate and t-butylperoctoate were employed, they were fed to a line equivalent to line 21 as a solution in ethylbenzene. The temperature of the vessel 22 was about 85° C. at the entrance, 104° C. at the center and 100° C. at the exit. About 5 weight percent polymer solids were formed in vessel 22. The polymer solids in vessels 24 and 27 were maintained at about 42 and 49 weight percent solids respectively. The temperature adjacent the exit of vessel 24 was 126° C. and at a similar location in vessel 27 was 139° C. The following solution was added at the rate of 72 grams per hour through line 33 to vessel 27. The solution was 18.4 parts by weight of styrene; 7.6 of acrylonitrile; 69.5 parts by weight ethylbenzene; 1.5 parts by weight of stabilizer commercially available under the trade designation of Irganox 1076, and 3 parts by weight of alpha-methylstyrene dimer as a chain transfer agent. The effluent from the vessel 31 was about 66 weight percent solids. The effluent was devolatilized in a devolatizing extruder and the polymer was cooled, ground, and compression molded to provide test specimens. The results are set forth in Table I.

TABLE I

| Catalyst in Feed | Catalyst Level | % Solids from Vessel 22 | Ty (psi) | % Elong | Notched Izod ft.lb/in Notch | MFR (Cond. I) |
| --- | --- | --- | --- | --- | --- | --- |
| Lauroyl Peroxide | 500 ppm | 5.9 | 5400 | 2 | 2.6 | 3.7 |
| t-Butyl Peroxy-Pivalate | 200 ppm | 4.4 | 6000 | 2 | 4.2 | 3.0 |
| t-Butyl Peroctoate | 250 ppm | 4.0 | 5400 | 4 | 3.2 | 3.0 |

The t-butylperoxy pivalate and t-butylperoctoate provide a polymer that is very significantly tougher than the polymer that is obtained when a lauroyl peroxide is used.

EXAMPLE 2

Employing an apparatus generally in accordance with FIG. 3, lauroyl peroxide and t-butylperoctoate were compared. The feed to line 41 was a solution of 9 parts by weight of a butadiene rubber commercially designated as Solprene 308, 16 parts by weight of ethyl benzene, 53.8 parts by weight of styrene, 21 parts by weight of acrylonitrile, 0.15 parts by weight of α-methylstyrene dimer, and the peroxide in the amount indicated in Table II.

The temperature of the vessel 43 was about 79° C. at the entrance, 104° C. at the center and 100° C. at the exit. The feed rate was about 533 grams per hour. About 5 weight percent of polymer solids was formed in the polymerization vessel 42. Vessel 44 was maintained at temperatures of about 118° C. adjacent entrance and 123° C. adjacent the exit. Vessel 46 was maintained at temperatures of about 133° C. adjacent the entrance and 140° C. adjacent the exit. The discharge from the vessel 44 was about 33 weight percent solids. To line 51 was added, at a rate of about 77 grams per hour, a solution of 20 parts by weight of styrene, 7.4 parts by weight acrylonitrile, 66.6 parts by weight ethylbenzene, 3 parts by weight Irganox 1076 and 3 parts by weight of alpha-methylstyrene dimer. Vessel 48 was maintained at temperatures of about 131° C. adjacent the entrance and 157° C. adjacent the exit. The discharge from vessel 48 was about 62 weight precent solids. The effluent was devolatilized under the conditions of Example 1, compression molded into test specimens, and the results are set forth in Table II.

TABLE II

| Catalyst | Level in Feed | Solids Made in Vessel 22 | Tensile Yield | % Elong. | Notched Izod |
| --- | --- | --- | --- | --- | --- |
| Lauroyl Peroxide | 500 ppm | 5.2% | 6810 psi | 4.2 | 2.5 ft-lb/in |
| t-Butyl-peroctoate | 400 ppm | 4.25% | 7270 psi | 3.7 | 3.6 ft-lb/in |

Clearly, the t-butylperoctoate provides a significantly tougher polymer than does lauroyl peroxide.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of acrylonitrile-butadiene-styrene resins wherein styrene and acrylonitrile are copolymerized in the presence of a soluble butadiene reinforcing rubber, the butadiene rubber being dissolved in a mixture of acrylonitrile and styrene, initiating polymerization of the styrene and acrylonitrile thereby causing the rubber under the influence of agitation to separate in the form of a plurality of particles having average diameters of about 0.2 to about 5 microns, continuing polymerization of the styrene and acrylonitrile until from about 50 to about 90 weight percent of the styrene and acrylonitrile have copolymerized, removing at least a majority of non-volatile material therefrom and recovering an ABS polymer, the improvement which comprises incorporating within the ABS solution prior to polymerization a free radical polymerization initiating material which is a tertiary butyl peroxy ester having a 10 hour half-life of between about 50° and 95° C., or mixtures thereof.

2. The method of claim 1 wherein the initiator is selected from the group consisting of:
   t-Butylperoxy pivalate
   1,1,3,3-Tetramethylbutylperoxy-2-ethylhexanoate
   2,5-Dimethyl-2,5-bis(2-ethylhexanoylperoxy)hexane
   t-Butylperoctoate
   t-Butylperoxy isobutyrate
   t-Butylperoxy maleic acid
   and mixtures thereof.

3. The method of claim 2 wherein the initiator is tertiarybutylperoctoate.

4. The method of claim 1 wherein polymerization is carried out at a temperature of from about 60° to 180° C.

5. The method of claim 4 wherein the polymerization is initiated at a lower temperature and terminated at a higher temperature.

6. The method of claim 1 wherein the initiator is t-butylperoxypivalate.

* * * * *